US011269588B2

(12) United States Patent
Lee et al.

(10) Patent No.: US 11,269,588 B2
(45) Date of Patent: Mar. 8, 2022

(54) ELECTRONIC DEVICE FOR OUTPUTTING AUDIO THROUGH USB PORT AND METHOD THEREOF

(71) Applicant: Samsung Electronics Co., Ltd., Suwon-si (KR)

(72) Inventors: Wookwang Lee, Suwon-si (KR); Dongrak Shin, Suwon-si (KR); Hyomin Oh, Suwon-si (KR); Chul Kang, Suwon-si (KR); Taeuk Park, Suwon-si (KR); Hyungsik Park, Suwon-si (KR); Mira Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/947,111

(22) Filed: Jul. 17, 2020

(65) Prior Publication Data

US 2021/0019111 A1 Jan. 21, 2021

(30) Foreign Application Priority Data

Jul. 17, 2019 (KR) .......................... 10-2019-0086107

(51) Int. Cl.
*G06F 3/16* (2006.01)
*H04R 3/00* (2006.01)
*H04R 1/10* (2006.01)

(52) U.S. Cl.
CPC .............. *G06F 3/165* (2013.01); *G06F 3/162* (2013.01); *H04R 1/1041* (2013.01); *H04R 3/00* (2013.01);
(Continued)

(58) Field of Classification Search
CPC ....... G06F 3/162; G06F 3/165; H04R 1/1041; H04R 3/00; H04R 2420/05; H04R 2420/09
See application file for complete search history.

(56) References Cited

U.S. PATENT DOCUMENTS 8,106,948 B2   1/2012  Souma
8,891,216 B2  11/2014  Mullins et al.
(Continued)

FOREIGN PATENT DOCUMENTS

CN       109788387 A      5/2019
KR    10-2006-0106299 A  10/2006
KR    10-2015-0006123 A   1/2015

OTHER PUBLICATIONS

International Search Report and Written Opinion of the International Searching Authority in connection with International Application No. PCT/KR2020/009264 dated Nov. 23, 2020, 9 pages.

*Primary Examiner* — Joseph Saunders, Jr.

(57) ABSTRACT

An electronic device includes a universal serial bus (USB) port configured to be wiredly attached to an external audio device, a processor operatively connected to the USB port, and a memory operatively connected to the processor. The memory stores a media application to play audio data, and stores instructions that when executed, cause the processor to play the audio data through the media application, sense an event associated with detachment from the external audio device while the audio data is being played, pause playing the audio data, in response to that the event is sensed, identify whether a device the same as the external audio device is attached within a specified time after the event is sensed, and play the audio data, which is paused, through the media application, when the device the same as the external audio device is attached within the specified time.

18 Claims, 12 Drawing Sheets

(52) U.S. Cl.
 CPC ...... *H04R 2420/05* (2013.01); *H04R 2420/09* (2013.01)

(56) References Cited

U.S. PATENT DOCUMENTS

| | | |
|---|---|---|
| 9,100,744 B2 | 8/2015 | Sim et al. |
| 9,166,345 B2 | 10/2015 | Mullins et al. |
| 9,282,391 B2 | 3/2016 | Jung |
| 9,554,204 B2 | 1/2017 | Souma |
| 9,727,105 B2 | 8/2017 | Lee et al. |
| 10,210,122 B2 | 2/2019 | Feng et al. |
| 2006/0095623 A1* | 5/2006 | Nio .................. H04N 5/60 710/260 |
| 2006/0285677 A1* | 12/2006 | Souma ............ H04N 21/8106 379/388.03 |
| 2010/0115149 A1* | 5/2010 | Ewer ............... H04M 1/6066 710/19 |
| 2011/0058665 A1 | 3/2011 | Souma |
| 2012/0027215 A1 | 2/2012 | Sim et al. |
| 2012/0033824 A1 | 2/2012 | Sim et al. |
| 2013/0129109 A1 | 5/2013 | Jung |
| 2013/0286522 A1 | 10/2013 | Mullins et al. |
| 2015/0004840 A1 | 1/2015 | Mullins et al. |
| 2015/0012772 A1 | 1/2015 | Lee et al. |
| 2015/0078576 A1 | 3/2015 | Souma |
| 2016/0021158 A1* | 1/2016 | Donaldson .......... H04R 1/1041 709/203 |
| 2016/0357509 A1* | 12/2016 | Alsina ............... H04M 1/6083 |
| 2017/0039155 A1 | 2/2017 | Feng et al. |
| 2018/0270563 A1* | 9/2018 | Donaldson .......... H04L 63/0876 |
| 2020/0245051 A1 | 7/2020 | Hou et al. |

* cited by examiner

ELECTRONIC DEVICE FOR OUTPUTTING AUDIO THROUGH USB PORT AND METHOD THEREOF

CROSS-REFERENCE TO RELATED APPLICATION

This application is based on and claims priority under 35 U.S.C. § 119 to Korean Patent Application No. 10-2019-0086107 filed on Jul. 17, 2019 in the Korean Intellectual Property Office, the disclosure of which is incorporated by reference herein its entirety.

BACKGROUND

1. Field

The disclosure relates to a technology of outputting audio data through a universal serial bus (USB) port.

2. Description of Related Art

An electronic device to output audio data may output audio data, which is played, through an external audio device, such as an earphone, as well as a speaker embedded in the electronic device. The electronic device may be wiredly attached to the external audio device through a port.

The above information is presented as background information only to assist with an understanding of the disclosure. No determination has been made, and no assertion is made, as to whether any of the above might be applicable as prior art with regard to the disclosure.

SUMMARY

A portable device, such as a smartphone, may be attached to the external audio device through a universal serial bus (USB) port, instead of using a 3.5 pi port employing an analog scheme, for implementing a compact device or for minimizing an influence exerted on another component. However, when the USB port is used, a contact between the external audio device and the electronic device is smaller as compared to the content when the 35. Pi port is used. Accordingly, the USB port may be weak against an external shock. For example, when the electronic device is attached to the external audio device through a USB Type-C, and when the external shock (e.g., electrostatic discharge (ESD)) is applied to the port, an instantaneous noise is caused in a D+ and/or D− port, and the electronic device may pause media, which is playing the audio data, to prevent the audio data from being output through the speaker. A user may feel inconvenient as the media does not play the audio data any more.

Aspects of the disclosure are to address at least the above-mentioned problems and/or disadvantages and to provide at least the advantages described below. Accordingly, an aspect of the disclosure is to provide an electronic device, capable of outputting audio data through a USB port, and a method thereof.

In accordance with an aspect of the disclosure, an electronic device may include a universal serial bus (USB) port to be wiredly attached to an external audio device, a processor operatively connected to the USB port, and a memory operatively connected to the processor. The memory may store a media application to play audio data. The memory may store instructions that when executed, cause the processor to play the audio data through the media application, sense an event associated with detachment from the external audio device while the audio data is being played, stop playing the audio data, in response to that the event is sensed, identify whether a device the same as the external audio device is attached within a specified time after the event is sensed, and play the audio data, which is stopped, through the media application, when the device the same as the external audio device is attached within the specified time.

In accordance with another aspect of the disclosure, a method of an electronic device may include playing audio data of a media application stored in the electronic device, by using an external audio device attached through a USB port, sensing an event associated with detachment from the external audio device while the audio data is being played, stopping playing the audio data, in response to that the event is sensed; identifying whether a device the same as the external audio device is attached within a specified time after the event is sensed, and playing the stopped audio data through the media application, when the device the same as the external audio device is attached within the specified time.

In accordance with another aspect of the disclosure, an audio device may include a USB port configured to be wiredly attached to an external electronic device, and a processor operatively connected to the USB port. The processor may sense that the audio device is attached to the external electronic device through the USB port, sense an event associated with detachment from the external electronic device while outputting audio data generated from the external electronic device, identify whether a device the same as the external electronic device is attached within a specified time, after sensing the event, and transmit a signal for commanding play of the audio data to the external electronic device, when the device the same as the external electronic device is attached within the specified time.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

In the following description made with respect to the accompanying drawings, similar components will be assigned with similar reference numerals.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure.

Figure 1:
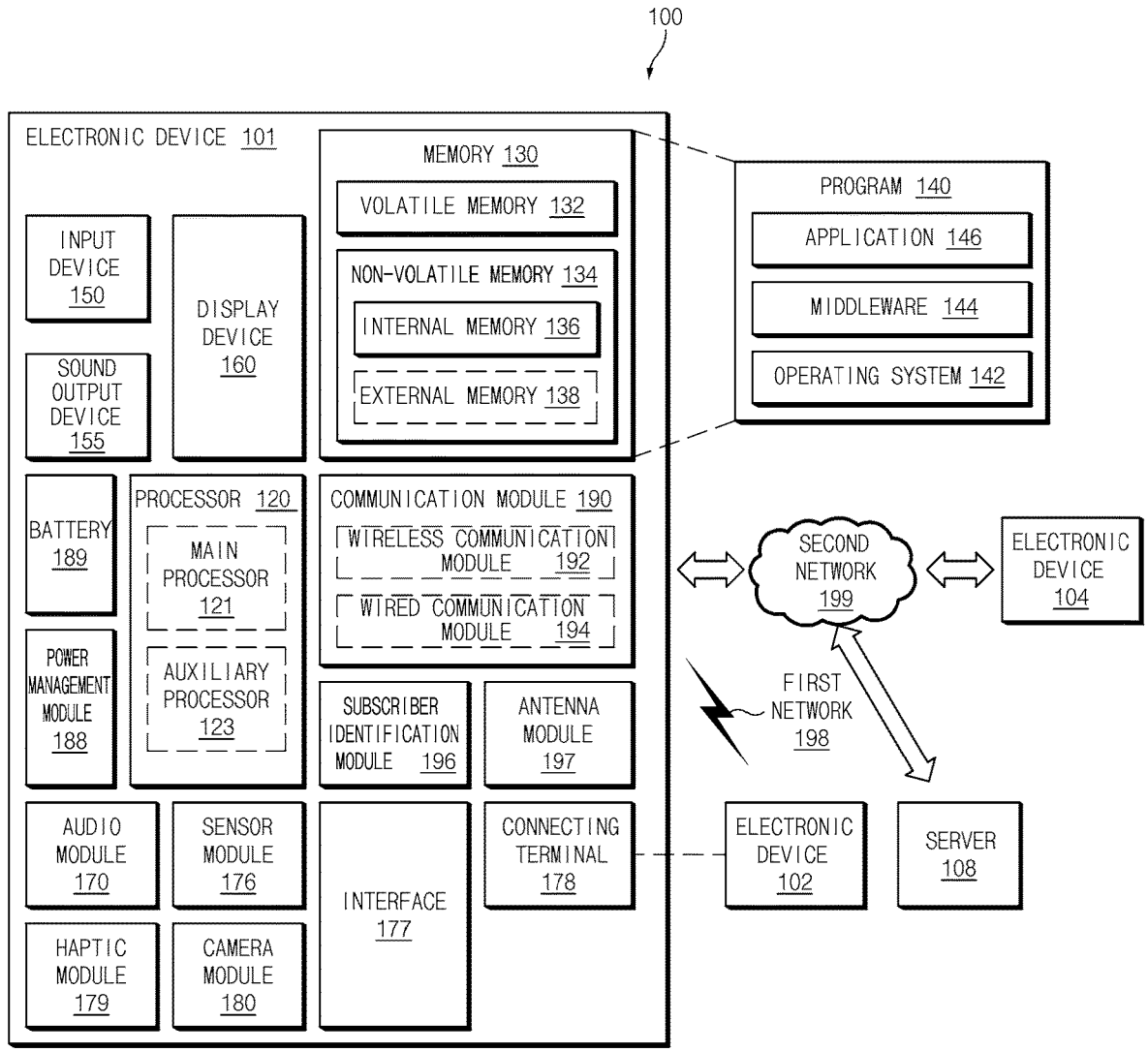
FIG. 1 is a block diagram illustrating an electronic device in a network environment, according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
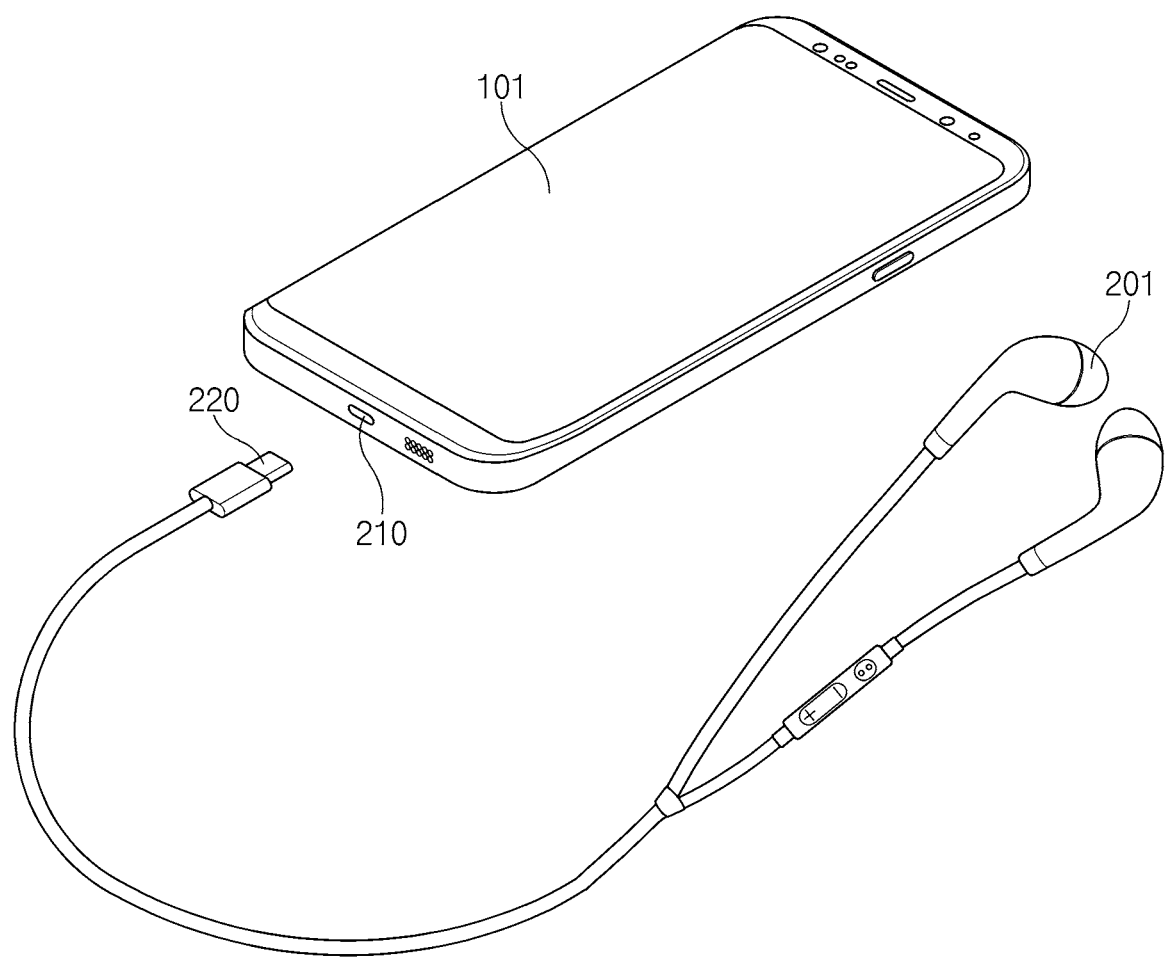
FIG. 2 illustrates an electronic device and an external audio device attached to each other through a USB port, according to various embodiments.

FIG. 2 illustrates the electronic device 101 and an audio device 201 attached to each other through a USB port, according to various embodiments.

Referring to FIG. 2, the audio device 201 may refer to a device wiredly connected to the electronic device 101 to output audio data played in the electronic device 101. Although FIG. 2 illustrates only the audio device 201 having the form of an earphone, the audio device 201 may be a headphone or an external speaker, according to various embodiments.

According to an embodiment, the electronic device 101 and the audio device 201 may be wiredly connected to each other through a USB port. The USB port may be referred to as a connector. For example, a connector 220 of the audio device 201 may be inserted into a connector 210 (e.g., at least a portion of the connecting terminal 178 of FIG. 1) of the electronic device 101. The audio device 201 may receive an audio file from the electronic device 101 through the connector 220, and may output audio data through the received audio file. The USB port may include, for example, a USB Type-C.

Figure 3:
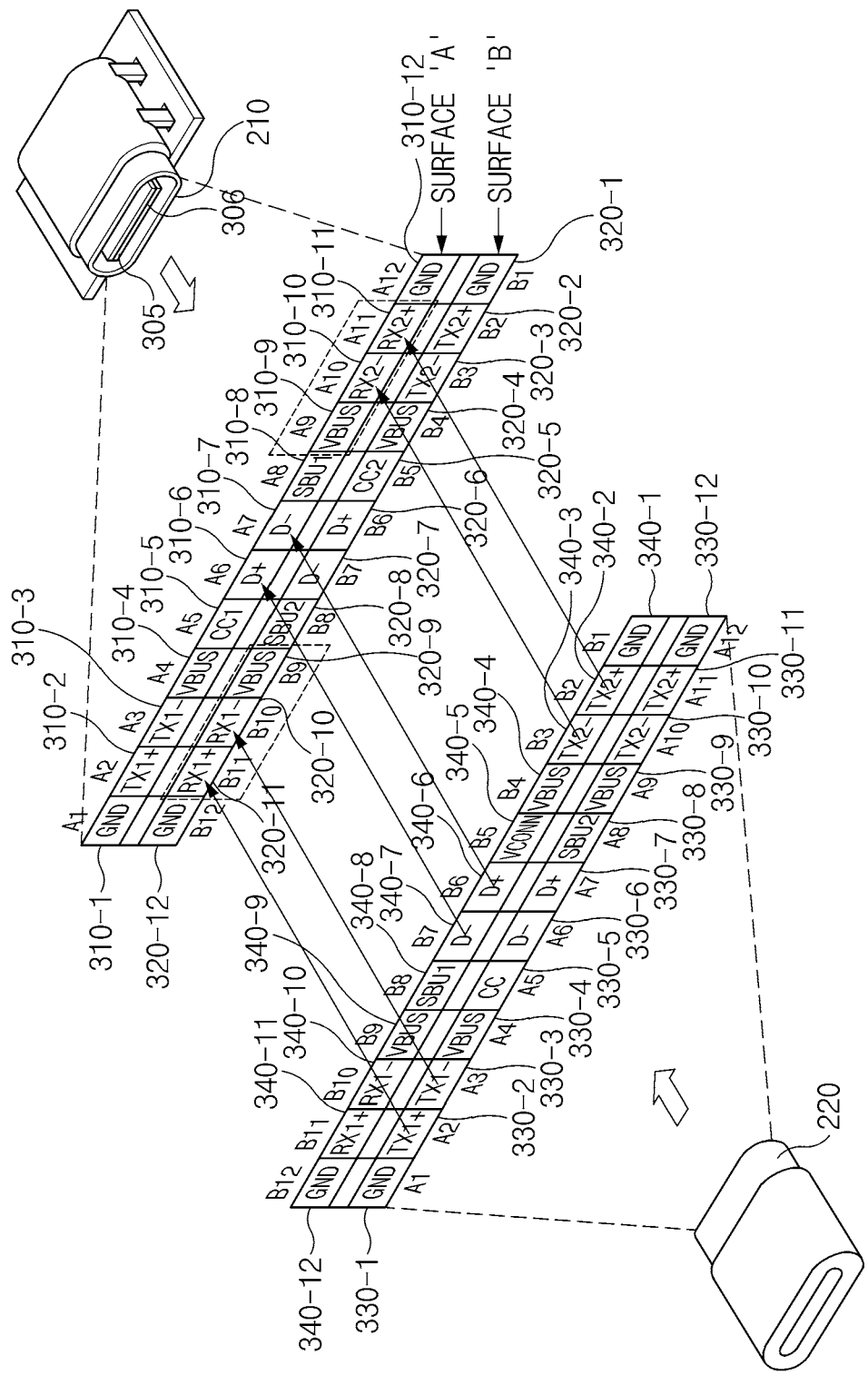
FIG. 3 illustrates a view of a configuration of a USB Type-C, according to various embodiments.

FIG. 3 illustrates a view of a configuration of a USB Type-C, according to various embodiments;

Referring to FIG. 3, the electronic device 101 may be wiredly attached to the audio device 201 through the connector 210. The connector 210 of the electronic device 101 may have an outer appearance allowing the connector 220 of the audio device 201 to be inserted in any one of a forward direction or a reverse direction (hereinafter, referred to as "reversibility"), and a contact board 305 may be formed inside the connector 210. The contact board 305 may include 12 pins 310-1, 310-2, . . . , and 310-12 provided on a first surface (e.g., surface 'A') corresponding to the forward direction, and 12 pins 320-1, 320-2, . . . , and 320-12 provided on a second surface (e.g., surface 'B') corresponding to the reverse direction. A mid-plate 306 having an electrically conductive property may be included in the contact board 305. The connector 220 of the audio device 201 may include 12 pins 330-1, 330-2, . . . , and 330-12 to make contact with the 12 pins 310-1, 310-2, . . . , and 310-12 provided on the first surface (e.g., surface 'A') of the contact board 305, and 12 pins 340-1, 340-2, . . . , and 340-12 to make contact with the 12 pins 320-1, 320-2, . . . , and 320-12 provided on the second surface (e.g., surface 'B') of the contact board 305. The number of pins provided in the connector 220 of the audio device 201 may be varied depending on the type of the audio device 201. The audio device 201 may have one or two CC pins depending on the type of the audio device 201. The order to arrange the 12 pins formed on the first surface (e.g., surface 'A') may be identical to the order to arrange the 12 pins formed on the second surface (e.g., surface 'B') such that the connector 220 of the audio device 201 is inserted in a direction of any one of the first surface or the second surface. Through such a structure, a user may insert a cable of the audio device 201, which is rotated at 180°, into the connector 210 of the electronic device 101.

According to an embodiment, the arrangement of pins formed on the first surface (e.g., surface 'A') and the second surface (e.g., surface 'B') of the contact board 305 is shown in table 1.

TABLE 1

| Pin No. | Pin No. | Signal Name | Function | Note |
|---|---|---|---|---|
| A1 | B1 | GND | Power | Ground (e.g. Support for 60 W minimum (combined with all VBUS pins)) |
| A2 | B2 | TX1+ or SSTXp1 | USB 3.1 or Alternate Mode | Super speed TX positive (e.g., 10 Gb/s differential pair with TX1−) |
| A3 | B3 | TX1− or SSTXn1 | USB 3.1 or Alternate Mode | Supper speed TX negative (e.g. 10 Gb/s differential pair with TX1+) |

TABLE 1-continued

| Pin No. | Pin No. | Signal Name | Function | Note |
|---|---|---|---|---|
| A4 | B4 | VBUS | Power | USB cable charging power (e.g., Support for 60 W minimum (combined with all VBUS pins)) |
| A5 | B5 | CC1, CC2 | CC or VCONN | Identification terminal |
| A6 | B6 | D+ | USB 2.0 | +line of the differential bi-directional USB signal |
| A7 | B7 | D− | USB 2.0 | −line of the differential bi-directional USB signal |
| A8 | B8 | SBU1, SBU2 | Alternate Mode | Side band Use: additional purpose pin(e.g., Audio signal, display signal, etc.) |
| A9 | B9 | VBUS | Power | USB cable charging power(e.g., Support for 60 W minimum (combined with all VBUS pins) |
| A10 | B10 | RX2− or SSRXn2 | USB 3.1 or Alternate Mode | Super speed RX negative (e.g., 10 Gb/s differential pair with RX2+) |
| A11 | B11 | RX2+ or SSRXp2 | USB 3.1 or Alternate Mode | Super speed RX negative (e.g., 10 Gb/s differential pair with RX2−) |
| A12 | B12 | GND | Power | Ground (e.g., Support for 60 W minimum (combined with all VBUS pins)) |

Referring to table 1, the connector 210 includes 12 pins provided on each of the first surface (e.g., surface 'A') and the second surface (e.g., surface 'B'). The 12 pins provided on the first surface (e.g., surface 'A') may include pin A1 (GND), pin A2 (TX1+), pin A3 (TX1−), pin A4 (VBUS), pin A5 (CC1), pin A6 (D+), pin A7 (D−), pin A8 (SBU1), pin A9 (VBUS), pin A10 (RX2−), pin A11 (RX2+), and pin A12 (GND). The 12 pins provided on the second surface (e.g., surface 'B') may include pin B1 (GND), pin B2 (TX2+), pin B3 (TX2−), pin B4 (VBUS), pin B5 (CC2 or VCONN), pin B6 (D+), pin B7 (D−), pin B8 (SBU2), pin B9 (VBUS), pin B10 (RX1−), pin B11 (RX1+), and pin B12 (GND).

The connector 210 of the USB Type-C may have 24 pins formed on the first surface and the second surface and arranged in a mirrored configuration due to the reversibility. Through such a structure, a user may mount the connector 220 of the audio device 201, which is rotated at 180°, into the connector 210 of the electronic device 101. In this case, symmetrical pins may not be used together. For example, when the TX1+ and TX1− pins are used, the TX2+, TX2−, RX2+, and RX2− pins may not be used. When the RX1+ and RX1− pins are used, the RX2+, RX2−, TX2+, and TX2− pins may not be used. The mid-plate 306 having an electrically conductive property may be included in the contact board 305 of the connector 210. Although the total of 24 pins (e.g., 12 pins on the first surface and 12 pins on the second surface) are present on the contact board 305, corresponding pins may not be simultaneously used. A pin to be used may be determined depending on a cable to be connected, a connector connected to an end of the cable, and a connection state of the connector 210, which is connected to the connector 220, of the electronic device 101.

According to an embodiment, the CC1 pin 310-5 formed on the first surface (e.g., surface 'A') and the CC2 pin 320-5 formed on the second surface (e.g., surface 'B') on the contact board 305 may be used to detect the usage of the audio device 201 connected to the connector 210. For example, when the CC1 pin 310-5 of the electronic device 101 is connected to the CC pin 330-5 of the audio device 201 as the connector 220 of the audio device 201 is inserted into the connector 210 of the electronic device 101 such that the first surface (e.g., surface 'A') of the connector 220 faces upward, the CC2 pin 320-5 of the electronic device 101 may be used to supply power (VCONN) for an integrated circuit (IC) for recognizing the audio device 201. For example, when the CC2 pin 320-5 of the electronic device 101 is connected to the CC pin 330-5 of the audio device 201 as the connector 220 of the audio device 201 is inserted into the connector 210 of the electronic device 101 such that the first surface (e.g., surface 'A') of the connector 220 faces downward, the CC1 pin 310-5 of the electronic device 101 may be used to supply power (VCONN) for an integrated circuit (IC) for recognizing the audio device 201. The CC pins 310-5 and 320-5 of the electronic device 101 may be connected to the CC or VCONN pin of the audio device 201, and may support the CC or VCONN pin.

According to an embodiment, the pin 310-8 (SBU1) and the pin 320-8 (SBU2) are low speed signal pins allocated for use in an alternate mode. Negotiation of this alternative mode between the electronic device 101 and the audio device 201 may be required, before transmitting/receiving power. According to an embodiment, the pin 310-8 (SBU1) and the pin 320-8 (SBU2) may be used to perform the initialization process of a UFS memory.

According to an embodiment, when the electronic device 101 receives data from the audio device 201 connected to the connector 210, pin A4 (VBUS), pin A10 (RX2−), pin A11 (RX2+), and pins A1 and A12 (GND) on the first surface (e.g., surface 'A') may be connected to pin A4 (VBUS), pin A2 (TX1+), pin A3 (TX1−), and pins A1 and A12 (GND) on the first surface (e.g., surface 'A') of the connector 220 of the audio device 201 or may be connected to pin B4 (VBUS), pin B2 (TX2+), pin B3 (TX2−), and pin A1 and A12 (GND) on the second surface (e.g., surface 'B').

According to an embodiment, the TX1+, TX1−, TX2+, TX2−, RX2+, RX2−, RX1+, and RX1− pins may support a display port (DP) protocol, a universal flash storage (UFS) protocol, a mobile high-definition link (MHL) protocol, or a peripheral component interconnect express (PCI) protocol, in addition the USB protocol (e.g., USB 3.1, or USB 3.0 protocol). For example, a TYPE C connector may support a non USB protocol using an alternate mode in an USB PD (power deliver) standard.

Figure 4:
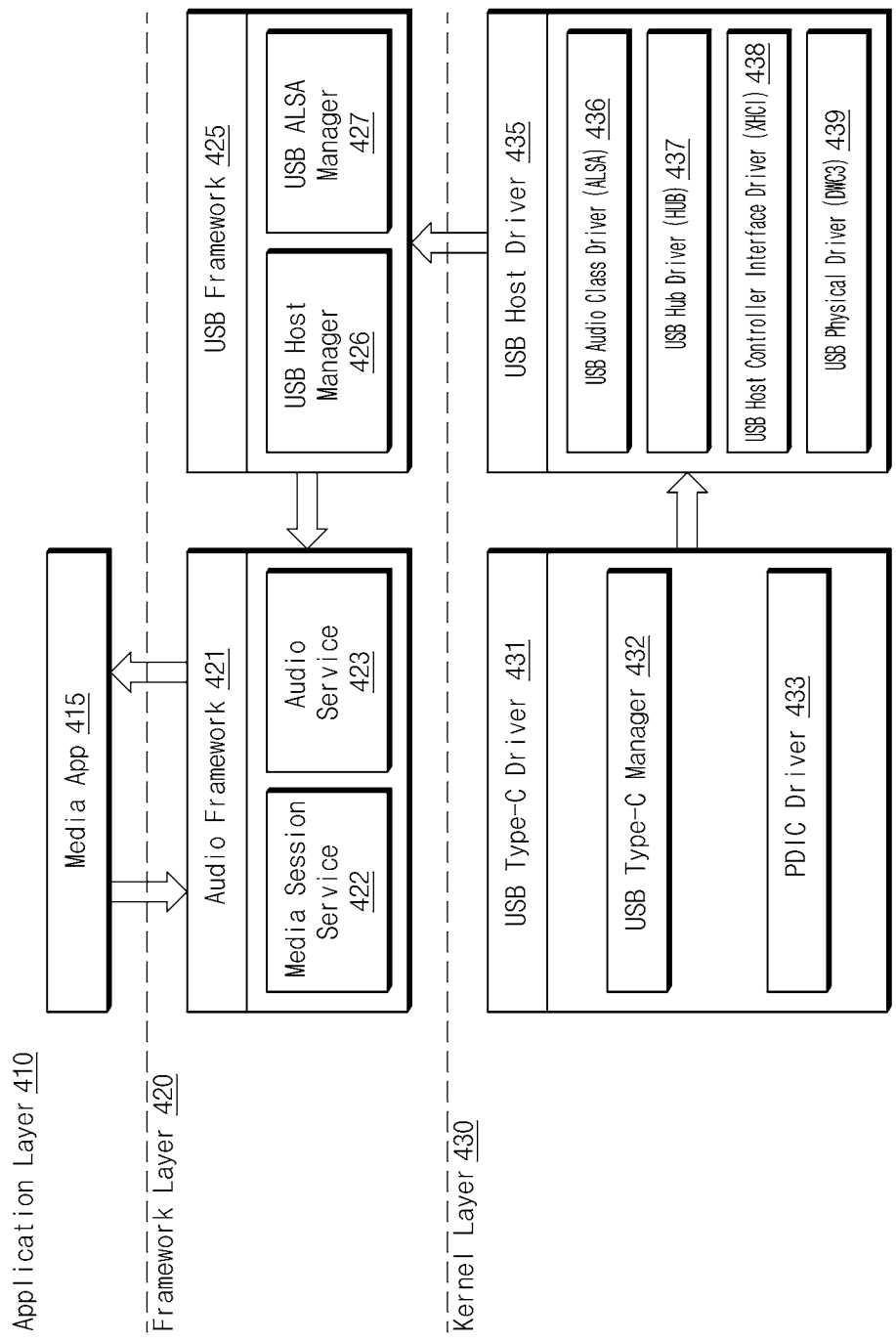
FIG. 4 illustrates a functional block diagram of some components of an electronic device, according to various embodiments.

FIG. 4 illustrates a functional block diagram of some components of the electronic device 101, according to various embodiments.

Referring to FIG. 4, the illustrated components may be a set of instructions stored in the memory 130 of the electronic device 101. For example, the components illustrated in FIG. 4 may be a program or software module. The electronic device 101 may perform operations to play audio data by running the components illustrated in FIG. 4 through a processor (e.g., the processor 120 of FIG. 1) included in the electronic device 101. Although not illustrated in FIG. 4, the USB port (e.g., the connector 210 of FIG. 2) of the electronic device 101 may be arranged at a lower level of a kernel layer 430.

An application layer 410 may include at least one application (e.g., the application 146 of FIG. 1). For example, a media application 415 may be stored in the application layer 410. The media application 415 may refer to an application (e.g., a music application, a radio application, or a video application) which may play audio data.

A framework layer 420 may perform an interface function between the application layer 410 and a kernel layer 430. The framework layer 420 may include an audio framework 421 and a USB framework 425. The audio framework 421 may include a media session service 422 and an audio service 423. The USB framework 425 may include a USB host manager 426 and a USB advanced LINUX sound architecture (ALSA) manager 427.

The kernel layer 430 may recognize the connection state between the USB port and an external electronic device (e.g., the audio device 201) and may load a function suitable for the external electronic device based on information (e.g., the class of the external electronic device) of the external electronic device. The kernel layer 430 may include a USB Type-C driver 431 and a USB host driver 435.

A series of operations to output the audio data through the audio device 201 using the components illustrated in FIG. 4 are as follows. When the connector 220 of the audio device 201 is inserted into the connector 210 of the electronic device 101, a resistance may be generated on the CC pin (e.g., the CC1 pin 310-5 or the CC2 pin 320-5 of FIG. 3). When the resistance is generated, an interrupt may occur in a power delivery integrated circuit (PDIC) driver 433 included in the USB Type-C driver 431, and a USB Type-C manager 432 may transmit a signal (e.g., the USB Host on message) for indicating the connection state of the audio device 201 to the USB host driver 435. When the signal is received, a USB host controller interface driver 438 and a USB physical driver 439 may be turned on. A USB hub driver 437 included in the USB host driver 435 may identify the connection of the audio device 201 through the received signal and may load a USB audio class driver 436 through an enumeration procedure. The USB audio class driver 436 may transmit information (e.g., the class of a device) on the recognized audio device 201 to the USB framework 425. The USB host manager 426 included in the USB framework 425 may recognize that an external device attached to the electronic device 101 is the audio device 201, by parsing the information received from the USB host driver 435, and may transmit the received information to the USB ALSA manager 427. The USB ALSA manager 427 may request the audio framework 421 to generate a path to output the audio data based on the received information. The audio service 423 may control the play state of the audio data depending on the attachment state of the audio device 201 attached through the USB port. For example, when the audio device 201 is disconnected, the audio service 423 may command the media application 415 to pause playing the audio data and may command the media application 415 to play the audio data when the audio device 201 is connected. The media session service 422 may receive information (e.g., at least one of a song tile or a play state) on the audio data, which is being played, from the media application 415 and may store and manage the received information.

Figure 5:
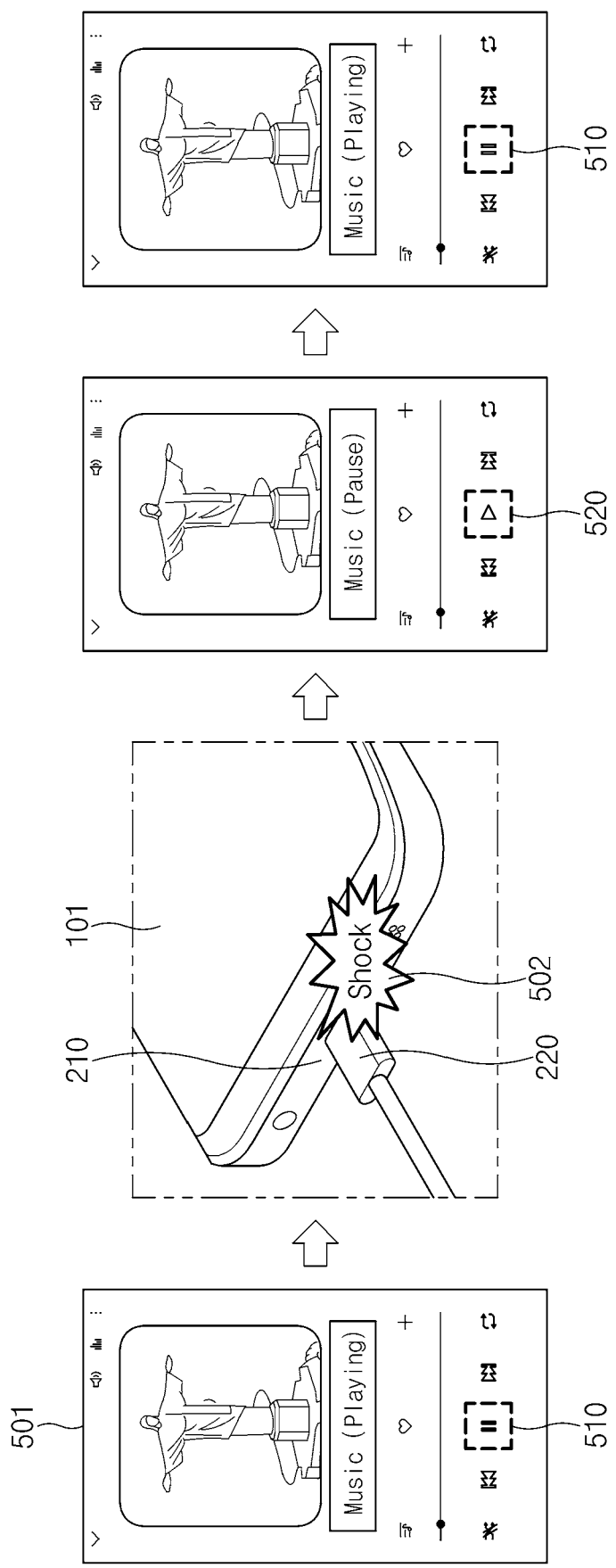
FIG. 5 illustrates a view of a screen associated with audio data played in an electronic device, according to various embodiments.

FIG. 5 illustrates a view of a screen associated with audio data played in the electronic device 101, according to various embodiments.

Referring to FIG. 5, when audio data (e.g., music) is played from the electronic device 101, the electronic device 101 may output a screen 501 associated with the audio data, which is being played, through a display (e.g., at least a portion of the display device 160 of FIG. 1). The screen 501 associated with the audio data may include an image for the audio data, which is being played, a text for indicating whether the audio data is being played, a play time, or a button to control a function (e.g., pause, rewind, or fast forward) associated with the play. For example, when the audio data is being played, the electronic device 101 may display a first GUI 510 (e.g., a pause button) for indicating that the audio data is being played on the screen 501.

While the audio data is being played in the electronic device 101, an external shock 502 may be applied to the USB port (e.g., connectors 210 and 220) in the state that the audio device 201 is not detached from the electronic device 101. When the external shock 502 is applied to the USB port, short may occur on a line (e.g., D+ and/or D−) through which the audio data is transmitted. When the short occurs, the electronic device 101 may recognize that the audio device 201 is detached. When the audio device 201 is recognized as being detached, the electronic device 101 may pause playing the audio data to prevent the audio data, which is being played, from being output through a speaker (e.g., at least a portion of the sound output device 155 of FIG. 1) even though the audio device 201 is not detached from the electronic device 101 actually. In this case, the electronic device 101 may display the second GUI 520 (e.g., play button) for indicating that the audio data is paused within the screen 501.

When the audio data is paused even though the audio device 201 is not detached from the electronic device 101, there may occur an inconvenient situation that the user cannot listen to the audio data. Accordingly, when a specified condition is satisfied, the electronic device 101 may play the audio data without a user input. For example, when sensing the attachment of an external device (that is, the audio device 201) within a specified time after the detachment of the audio device 201 is sensed, the electronic device 101 may display the first GUI 510 for indicating that the audio data is being played within the screen 501.

Figure 6:
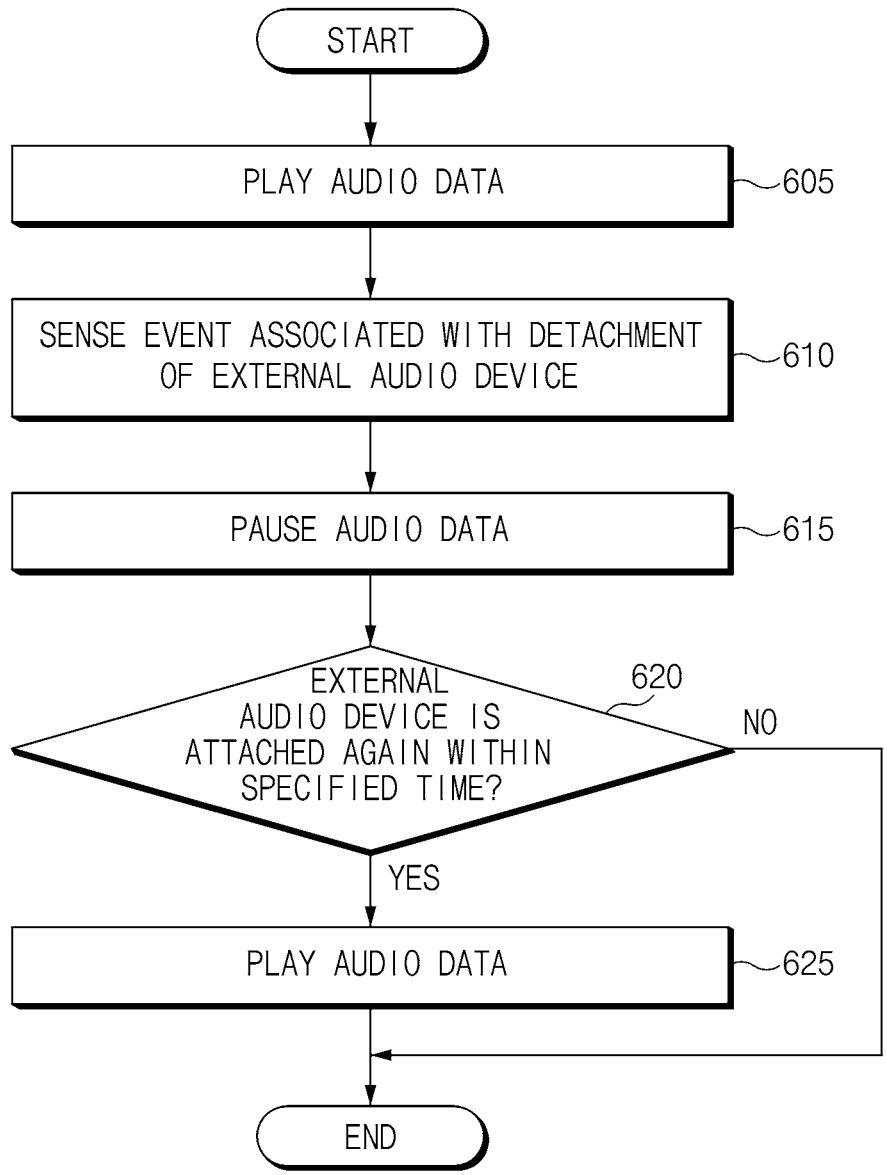
FIG. 6 illustrates a flowchart of an operation of an electronic device to play audio data, according to various embodiments.

FIG. 6 illustrates a flowchart of an operation of an electronic device to play audio data, according to various embodiments. In the following description, operations illustrated in FIG. 6 and another flowchart may be performed by the electronic device 101. For example, the processor 120 of the electronic device 101 may perform the operations by executing instructions (e.g., program or a software module of FIG. 4) stored in the memory 130.

Referring to FIG. 6, in operation 605, the electronic device 101 may play audio data. The electronic device 101 may play audio data in the state that an external audio device (e.g., the audio device 201 of FIG. 2) is attached to the electronic device 101 through a USB port. The USB port may include, for example, a USB Type-C. The played audio data may be output through the external audio device.

While the audio data is being played, the electronic device 101 may sense an event associated with the detachment of the external audio device in operation 610. For example, when the short occurs on some line (e.g., D+ and/or D−) of the USB port, the electronic device 101 may sense the event associated with the detachment of the external audio device.

The electronic device 101 may pause the audio data, which is being played, in operation 615, in response to that the event is sensed.

In operation 620, the electronic device 101 may identify whether the same external audio device is attached again within a specified time (e.g., 800 ms) after the event is sensed. For example, the electronic device 101 may identify whether an external audio device the same as a previous device is attached again, through the CC pin of the USB port.

When the same external audio device is attached again within the specified time ('YES' of operation 620), the electronic device 101 may play the paused audio data in operation 625. When the same external audio device is not attached again within the specified time ('NO' of operation 620), the external audio device may be detached by the user. Accordingly, the electronic device 101 may terminate an algorithm without playing the audio data.

Figure 7:
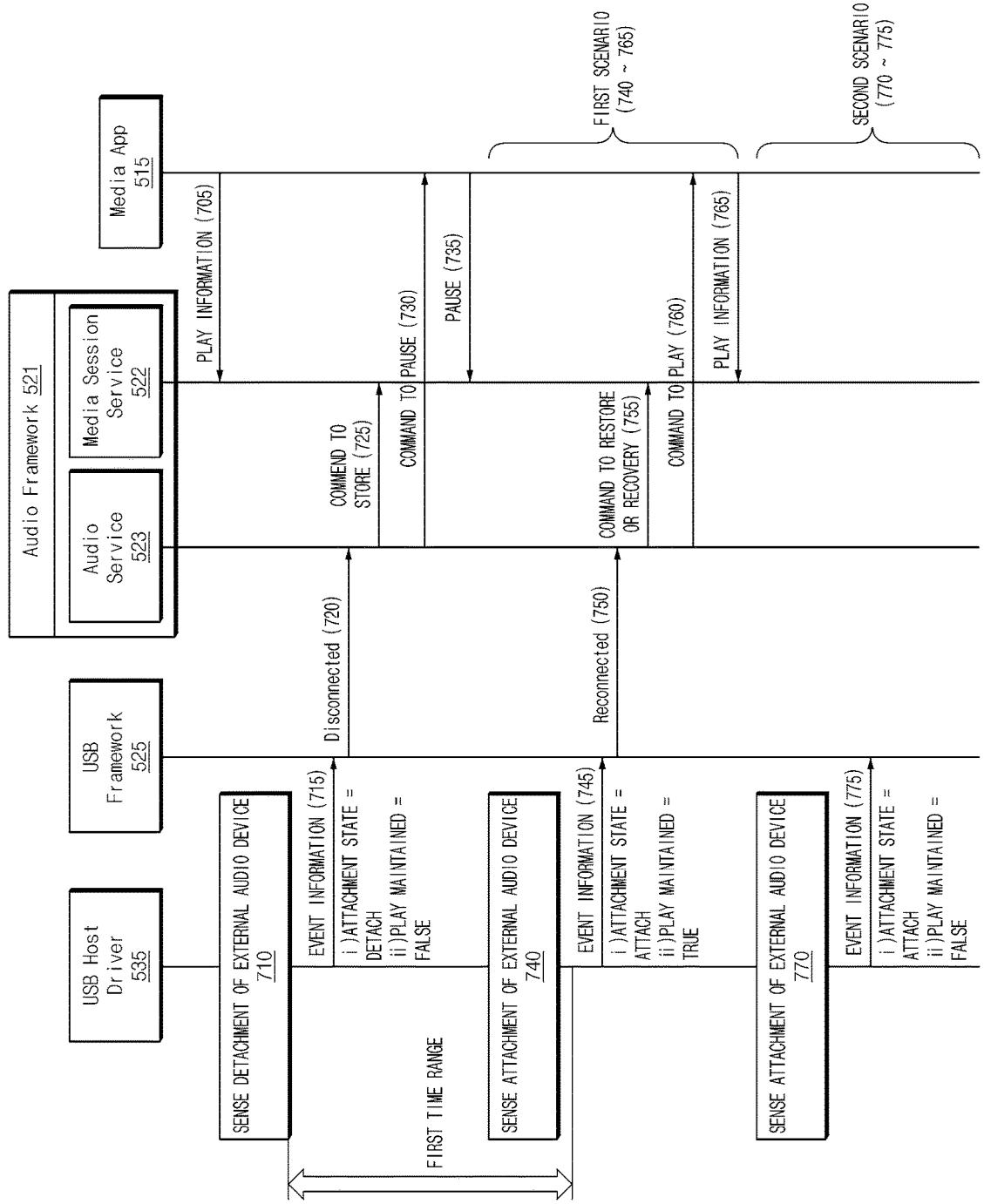
FIG. 7 illustrates a signal flowchart between layers to play audio data, according to various embodiments.

FIG. 7 illustrates another signal flowchart between layers to play audio data, according to various embodiments.

Referring to FIG. 7, a USB host driver 535 may control a play state of audio data by transmitting event information for indicating information associated with attachment of an external audio device to a USB framework 525. The configuration included in the event information and the meaning of the event information may be expressed as in following Table 2.

TABLE 2

| Configuration | Information | Meaning |
| --- | --- | --- |
| action | change | Change, which is associated with attachment or detachment of external audio device, occurs. |
| USBAUDIO_STATE | i) ATTACH<br>ii) DETACH | i) External audio device attached<br>ii) External audio device detached |
| KEEP_PLAY_MUSIC | i) TRUE<br>ii) FALSE | i) Same device attached within specified time after detachment of external audio device.<br>ii) Same device not attached within specified time after detachment of external audio device |
| CUR | | Present time |
| LAST | | Previous time |
| DIFF | | Present time-previous time |

For example, referring to table 2, when the external audio device is attached to the electronic device 101 first, 'USBAUDIO_STATE' may indicate 'ATTACH', and 'KEEP_PLAY_MUSIC' may indicate 'FALSE'. When it is sensed that the external audio device is detached from the electronic device 101, 'USBAUDIO_STATE' may indicate 'DETACH', and 'KEEP_PLAY_MUSIC' may indicate 'FALSE'. When it is sensed that the same external audio device is attached to the electronic device 101 within a specified time after detached from the electronic device 101, 'USBAUDIO_STATE' may indicate 'ATTACH' and 'KEEP_PLAY_MUSIC' may indicate 'TRUE'. When it is sensed that the same external audio device is attached to the electronic device 101 or a different external audio device is attached to the electronic device 101 after the specified time is elapsed from the detachment of the external audio device from the electronic device 101, 'USBAUDIO_STATE' may indicate 'ATTACH' and 'KEEP_PLAY_MUSIC' may indicate 'FALSE'.

In operation 705, the audio data may be played in the electronic device 101 in the state that the external audio device (e.g., the audio device 201 of FIG. 2) is attached to the electronic device 101 through the USB port. For example, a media application 515 may periodically transmit play information (e.g., an audio file, a song title, or a play state) necessary for outputting the audio data to a media session service 522.

In operation 710, the USB host driver 535 may sense the detachment of the external audio device.

The USB host driver 535 may transmit the event information to the USB framework 525 in operation 715, in response to that the detachment of the external audio device is sensed. Information (e.g., USBAUDIO_STATE) for indicating an attachment state in information contained in the event information may indicate 'DETACH', and information (e.g., KEEP_PLAY_MUSIC) for indicating whether the play is maintained may indicate 'FALSE'.

In operation 720, the USB framework 525 may transmit a message to an audio framework 521 based on the received event information. The information for indicating the attachment state indicates 'DETACH', so the USB framework 525 may transmit a message for indicating 'Disconnected' to the audio framework 521.

In operation 725, an audio service 523 may command the media session service 522 to store information on media, which is currently playing the audio data, based on the received message. The information on the media, which is currently playing the audio data, may include, for example, at least one of identification information or play information of an application (e.g., the media application 515) which is playing the audio data. Although not illustrated in FIG. 7, the media session service 522 may store information on the media based on the received command.

When the information on the media is stored, in operation 730, the audio service 523 may transmit a message (e.g., becoming noisy) for commanding the media application 515 to pause the audio data, which is being played, to the media application 515.

The media application 515 may pause playing the audio data in operation 735, in response to receiving the message. For example, the media application 515 may notify the media session service 522 of that the transmission of the play information is paused.

According to various embodiments, the USB host driver 535, the USB framework 525, the audio framework 521, and the media application 515 may perform operation 740 to operation 765 according to a first scenario, or may selectively perform operation 770 to operation 775 according on a second scenario, based on whether the attachment of the external audio device is sensed within a specified first time after the detachment of the external audio device is sensed.

For example, according to the first scenario, the attachment of the external audio device may be sensed within the specified first time after the detachment of the external audio device is sensed (operation 740). In this case, in operation 745, the USB host driver 535 may transmit, to the USB framework 525, event information for indicating that information for indicating the attachment state represents 'ATTACH', and information for indicating whether the play is maintained represents 'TRUE'. In operation 750, the USB framework 525 may transmit, to the audio framework 521, a message for indicating 'Reconnected'. In operation 755, the audio service 523 may command the media session service 522 to restore or recover the stored information on the media. In operation 760, the media session service 522 may transmit a message for commanding the media application 515 to play the paused audio data. In operation 765, the media application 515 may play the paused audio data. For example, the media application 515 may transmit the play information to the media session service 522.

For example, according to the second scenario, the attachment of the external audio device may be sensed after the first time range is elapsed (operation 770). For another example, although not illustrated in FIG. 7, the external audio device attached within the first time range may be a device different from a previous external audio device. In this case, in operation 775, the USB host driver 535 may transmit, to the USB framework 525, event information for indicating that information for indicating the attachment state represents 'ATTACH', and information for indicating whether the play is maintained represents 'FALSE'. Operation 770 may refer to that the previous external audio device is detached by a user or that the previous external audio device is replaced with another external audio device, so the USB framework 525 may not transmit, to the audio framework 521, a message for maintaining the audio data paused.

Figure 8:
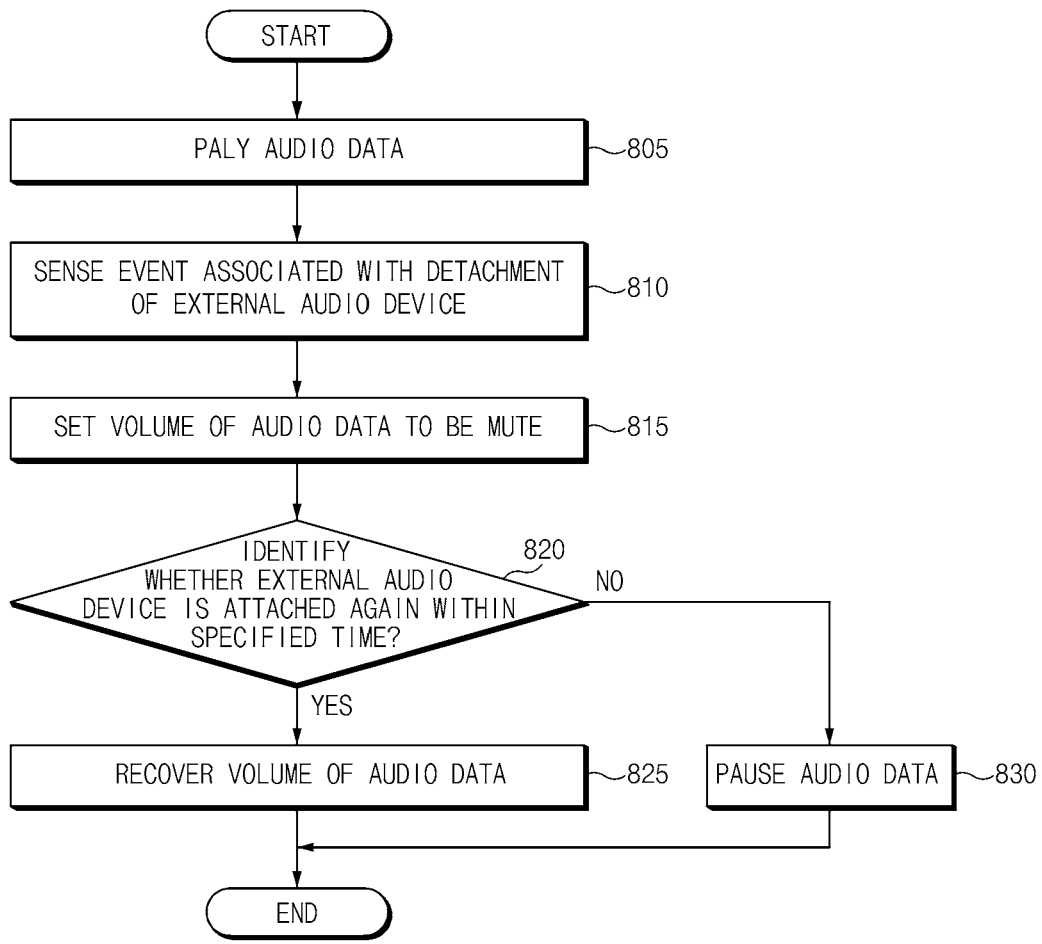
FIG. 8 illustrates another flowchart of an operation of an electronic device to play audio data, according to various embodiments.

FIG. 8 illustrates another flowchart of an operation of the electronic device 101 to play audio data, according to various embodiments. Operations illustrated in FIG. 8 may be performed in parallel to or independently from operations illustrated in FIG. 6.

Referring to FIG. 8, in operation 805, the electronic device 101 may play audio data (e.g., operation 605 of FIG. 6). While the audio data is being played, the electronic device 101 may sense an event associated with the detachment of the external audio device in operation 810.

In operation 815, the electronic device 101 may set the volume of the audio data to be mute to prevent the audio data, which is being played, from being output through the speaker, in response to that the event is sensed.

In operation 820, the electronic device 101 may identify whether the same external audio device is attached again within a specified time (e.g., 800 ms) after the event is sensed (e.g., operation 620 of FIG. 6).

When the same external audio device is attached again within the specified time ('YES' of operation 820), the electronic device 101 may recover the volume of the audio data in operation 825. When the same external audio device is not attached again within the specified time ('No' of operation 820), the electronic device 101 may pause the audio data in operation 830 because the external audio device is detached by the user.

Figure 9:
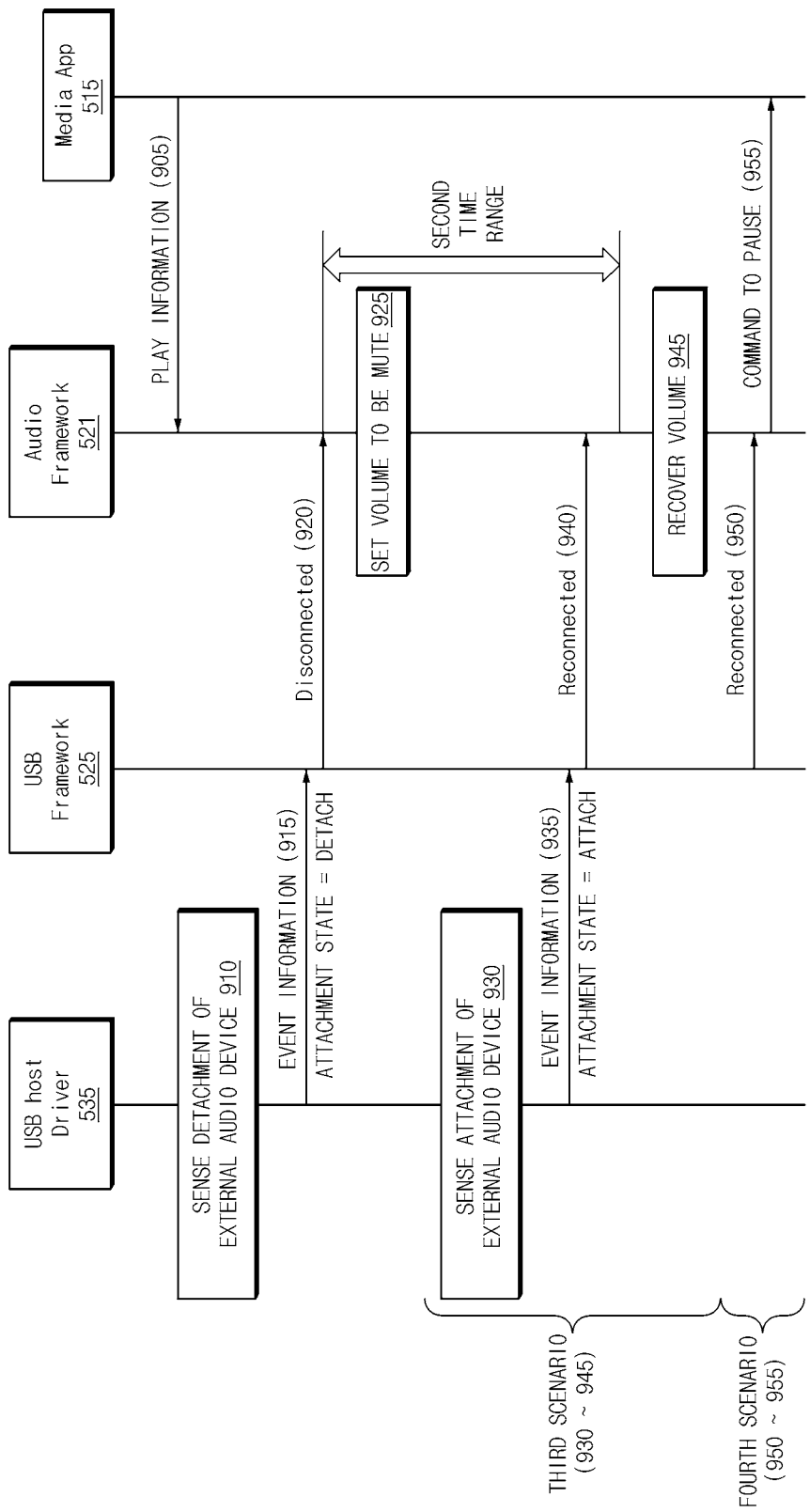
FIG. 9 illustrates another signal flowchart between layers to play audio data, according to various embodiments.

FIG. 9 illustrates another signal flowchart between layers to play audio data, according to various embodiments.

Referring to FIG. 9, in operation 905, the audio data may be played in the electronic device 101 in the state that an external audio device (e.g., the audio device 201 of FIG. 2) is attached to the electronic device 101 through the USB port (e.g., operation 705 of FIG. 7).

In operation 910, the USB host driver 535 may sense the detachment of the external audio device (e.g., operation 710 of FIG. 7).

In response to that the detachment of the external audio device is sensed, in operation 915, the USB host driver 535 may transmit the event information to the USB framework 525. The information (e.g., USBAUDIO_STATE) for indicating an attachment state in information contained in the event information may represent 'DETACH'.

In operation 920, the USB framework 525 may transmit a message to the audio framework 521 based on the received event information. The information for indicating the attachment state represents 'DETACH', so the USB framework 525 may transmit the message for indicating 'Disconnected' to the audio framework 521.

In operation 925, the audio framework 521 (e.g., the audio service 523) may set the volume of the audio data, which is being played, to be mute based on the received message.

According to various embodiments, the USB host driver 535, the USB framework 525, and the audio framework 521 may perform operation 930 to operation 945 according to a third scenario or may perform operation 950 to operation 955 according to a fourth scenario, based on whether the message for indicating 'Reconnected' is received within a specified second time after receiving the message for indicating 'Disconnected'. According to an embodiment, the second time range may be substantially equal to or different from the first time range of FIG. 7.

For example, according to the third scenario, the message for indicating 'Reconnected' may be received within the specified second time after receiving the message for indicating 'Disconnected' (operation 940). For example, the attachment of the external audio device within the second time range is sensed by the USB host driver 535 (operation 930), and the USB host driver 535 may transmit, to the USB framework 525, the event information for indicating that the information for indicating the attachment state represents 'ATTACH' (operation 935). The USB framework 525 may transmit, to the audio framework 521, the message for indicating 'Reconnected' based on the received message. In operation 945, the audio framework 521 may recover the volume of the audio data.

For another example, according to the fourth scenario, in operation 950, the audio framework 521 may receive the message for indicating 'Reconnected' after the second time range. For another example, although not illustrated in FIG. 9, the audio framework 521 may receive the message for indicating 'Disconnected' within or after the second time range. In operation 955, the audio framework 521 may command the media application 515 to pause the audio data which is being played.

Figure 10:
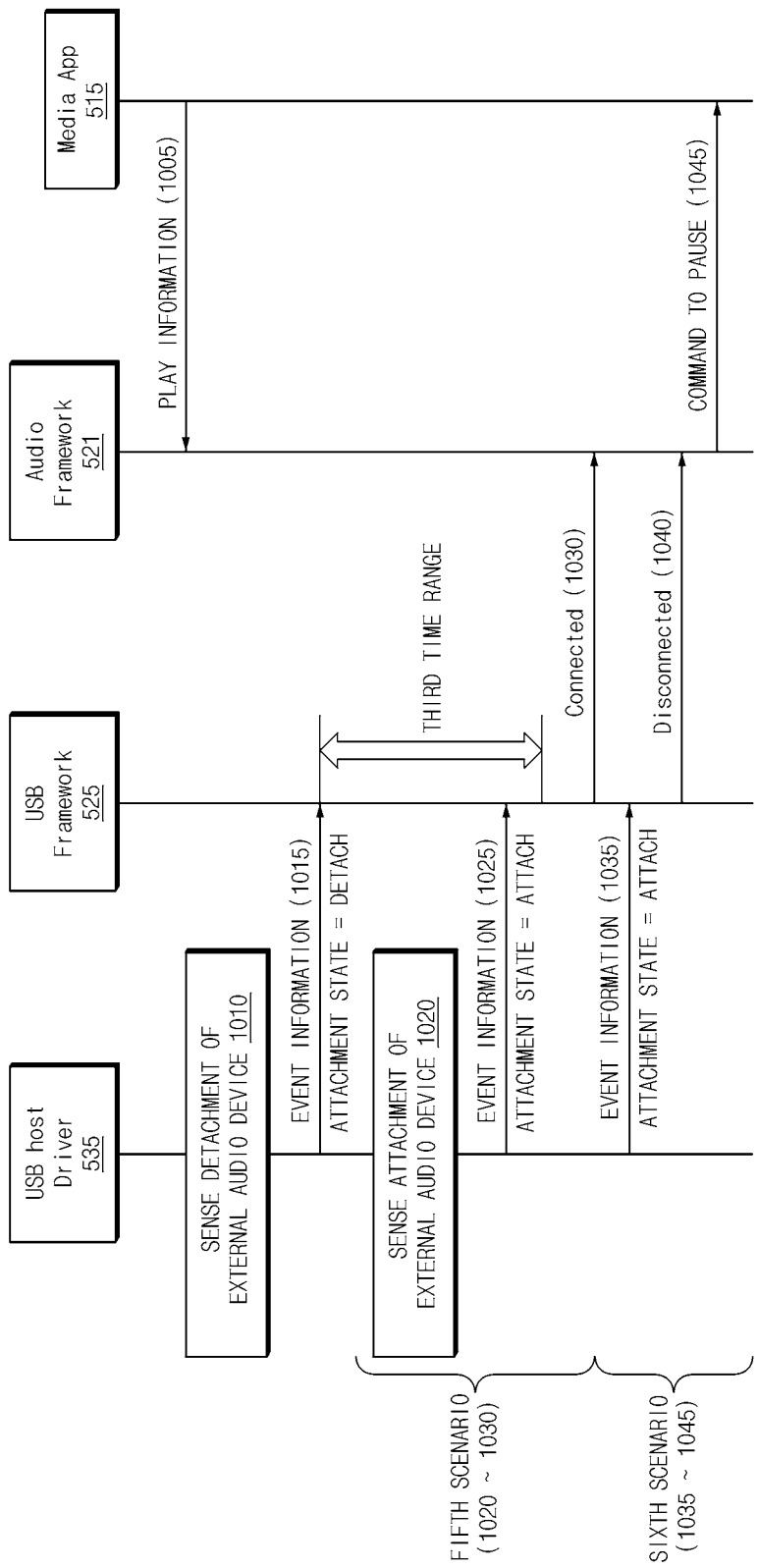
FIG. 10 illustrates another signal flowchart between layers to play audio data, according to various embodiments.

FIG. 10 illustrates another signal flowchart between layers to play audio data, according to various embodiments.

Referring to FIG. 10, in operation 1005, the audio data may be played in the electronic device 101 in the state that an external audio device (e.g., the audio device 201 of FIG. 2) is attached to the electronic device 101 through the USB port (e.g., operation 705 of FIG. 7).

In operation 1010, the USB host driver 535 may sense the detachment of the external audio device (e.g., operation 710 of FIG. 7).

In response to that the detachment of the external audio device is sensed, in operation 1015, the USB host driver 535 may transmit the event information to the USB framework 525. Information (e.g., USBAUDIO_STATE) for indicating an attachment state in information contained in event information may represent 'DETACH'.

According to various embodiments, the USB host driver 535 and the USB framework 525 may perform operation 1020 to operation 1030 according to a fifth scenario or may perform operation 1035 to operation 1045 according to a sixth scenario, based on whether the event information for indicating 'ATTACH' is received within a third time range after the event information for indicating 'DETACH' is received. According to an embodiment, the third time range may be substantially equal to or different from the second time range of FIG. 9.

For example, according to the fifth scenario, the USB framework 525 may receive the event information for indicating 'ATTACH' within the third time range after the event information for indicating 'DETACH' is received. For example, the USB host driver 535 may sense that the external audio device is attached within the third time range (operation 1020), and may transmit, to the USB framework, the event information for indicating 'ATTACH' (operation 1025). In operation 1030, the USB framework 525 may transmit a message for indicating 'Connected' to the audio framework 521 based on the received event information.

According to another embodiment, the USB framework 525 may not transmit the message so as to maintain the play state, in operation 1030.

For another example, according to the sixth scenario, in operation 1035, the USB framework 525 may not receive the event information within the third time range, or may receive the event information for indicating 'ATTACH' after the third time range is elapsed. In operation 1040, the USB framework 525 may transmit, to the audio framework 521, the message for indicating 'Disconnected'. In response to receiving the message, in operation 1040, the audio framework 521 may command the media application 515 to pause the audio data which is being played.

Figure 11:
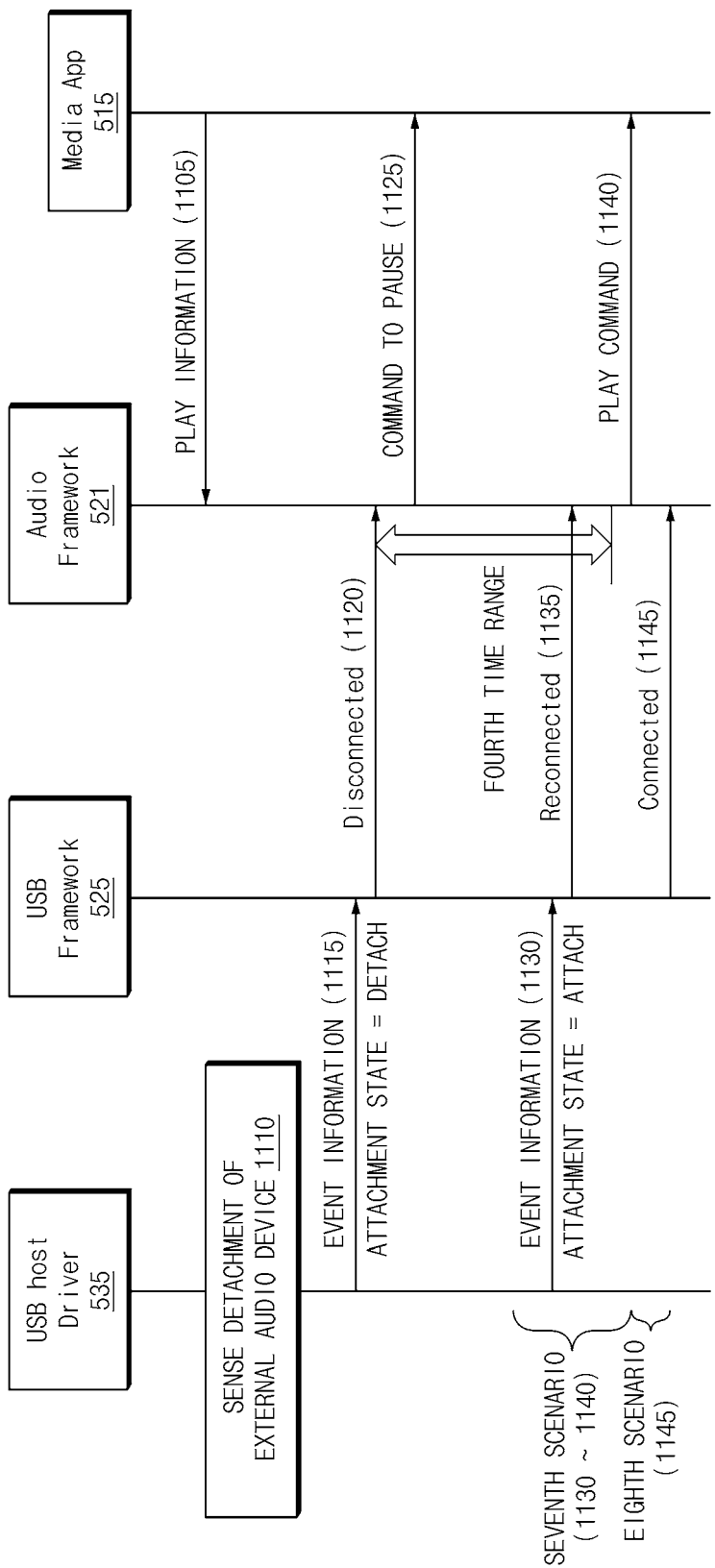
FIG. 11 illustrates another signal flowchart between layers to play audio data, according to various embodiments.

FIG. 11 illustrates another signal flowchart between layers to play audio data, according to various embodiments.

Referring to FIG. 11, in operation 1105, audio data may be played in the electronic device 101 in the state that an external audio device (e.g., the audio device 201 of FIG. 2) is attached to the electronic device 101 through a USB port (e.g., operation 705 of FIG. 7).

In operation 1110, the USB host driver 535 may sense the detachment of the external audio device (e.g., operation 710 of FIG. 7).

In response to that the detachment of the external audio device is sensed, in operation 1115, the USB host driver 535 may transmit event information to the USB framework 525. The information (e.g., USBAUDIO_STATE) for indicating an attachment state in information contained in the event information may represent 'DETACH'.

In operation 1120, the USB framework 525 may transmit, to the audio framework 521, the message for indicating 'Disconnected'.

In operation 1125, the audio framework 521 may command the media application 515 to pause the audio data which is being played.

According to various embodiments, the USB host driver 535, the USB framework 525, and the audio framework 521 may perform operation 1130 to operation 1140 according to a seventh scenario or may perform operation 1145 according to an eighth scenario, based on whether the message for indicating 'Reconnected' is received within a specified fourth time range after receiving the message for indicating 'Disconnected'. According to an embodiment, the fourth time range may be substantially equal to or different from the third time range of FIG. 10.

For example, according to the seventh scenario, the audio framework 521 may receive the message for indicating 'Reconnected' within the specified fourth time range after receiving the message for indicating 'Disconnected'. For example, the USB framework 525 may receive the event information for indicating 'ATTACH' from the USB host driver within the fourth time range (operation 1130), and may transmit, to the audio framework 521, the message for indicating 'Reconnected' based on the received event information (operation 1135). In operation 1140, the audio framework 521 may command the media application 515 to play the audio data which is paused, based on the received message.

For another example, according to the eight scenario, in operation 1145, the audio framework 521 may not receive the message for indicating 'Reconnected' within the fourth time range, or may receive the message for indicating 'Connected (or Reconnected)' after the fourth time range is elapsed. In response to receiving the message, the audio framework 521 may not transmit any command to the media application 515 to maintain the audio data paused.

Figure 12:
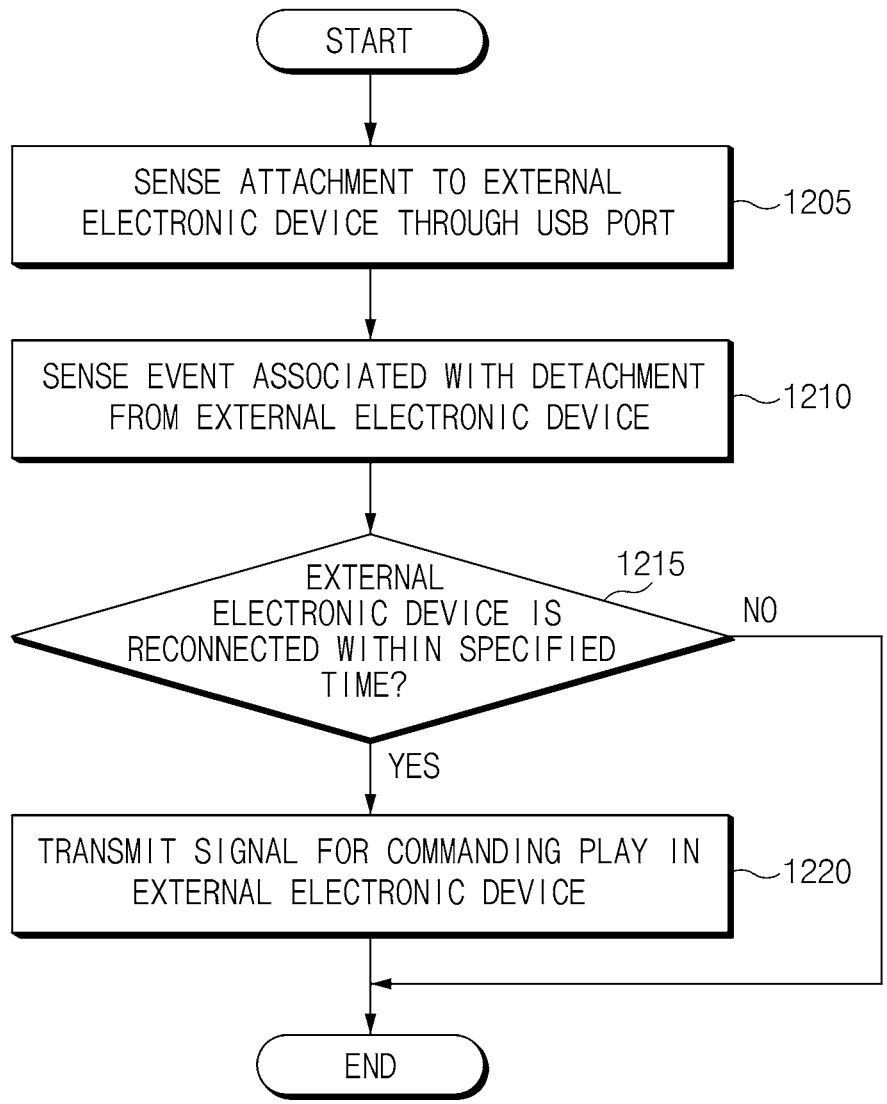
FIG. 12 illustrates a flowchart of an operation of an audio device to play audio data, according to various embodiments.

FIG. 12 illustrates a flowchart of an operation of the audio device 201 to play audio data, according to various embodiments. According to an embodiment, a processor (e.g., the processor 120 of FIG. 1) of the audio device 201 may perform operations illustrated in FIG. 12 by executing instructions stored in a memory (e.g., the memory 130 of FIG. 1).

Referring to FIG. 12, in operation 1205, the audio device 201 may sense attachment to an external electronic device (e.g., the electronic device 101 of FIG. 2) through a USB port (e.g., the connector 220 of FIG. 2). The USB port may include, for example, a USB Type-C.

In operation 1210, the audio device 201 may sense an event associated with detachment from the external electronic device while outputting audio data received from the external electronic device through the USB port. For example, the audio device 201 may sense the event associated with the detachment when short occurs on some lines (e.g., D+ and/D−) of the USB port.

In operation 1215, the audio device 201 may identify whether to be attached to the external electronic device again within a specified time range (e.g., 800 ms) after sensing the event. For example, the audio device 201 may identify whether the external electronic device the same as a previous device is attached again, through the CC pin of the USB port.

When the same external electronic device is attached again within the specified time ('YES' of operation 1215), the audio device 201 may transmit a signal for commanding the external electronic device to play the paused audio data in operation 1220. When the same external electronic device is not attached again within the specified time ('NO' of operation 1215), the external electronic device is disconnected by the user. Accordingly, the audio device 201 may terminate an algorithm.

As described above, according to various embodiments, an electronic device (e.g., 101 of FIG. 1) may include a universal serial bus (USB) port (e.g., 210 of FIG. 2) configured to be wiredly attached to an external audio device, a processor (e.g., 120 of FIG. 1) operatively connected to the USB port; and a memory (e.g., 130 of FIG. 1) operatively connected to the processor. The memory may store a media application to play audio data. The memory stores instructions that when executed, cause the processor to play the audio data through the media application, sense an event associated with detachment from the external audio device while the audio data is being played, pause playing the audio data, in response to that the event is sensed, identify whether a device the same as the external audio device is attached within a specified time after the event is sensed, and play the audio data, which is paused, through the media application, when the device the same as the external audio device is attached within the specified time.

According to an embodiment, the USB port may include a USB Type-C.

According to an embodiment, the instructions may cause the processor to sense the event, based on short of a D+ line or a D− line.

According to an embodiment, the instructions may cause the processor to identify whether the device to the same as the external audio device is attached within the specified time, based on a CC pin of the USB port.

According to an embodiment, the electronic device may further include a display. The instructions may cause the processor to display, through the display, a first graphic user interface (GUI) for indicating that the play of the audio data is paused, in response to that the event is sensed, and display, through the display, a second GUI for indicating that the audio data is played, when the device to the same as the external audio device is attached within the specified time.

According to an embodiment, the instructions may cause the processor to set a volume of the audio data to be mute, in response to that the event is sensed, recover the volume of the audio data, when the device the same as the external audio device is attached within the specified time, and pause playing the audio data, when the device to the same as the external audio device is not attached within the specified time.

According to an embodiment, the instructions may cause the processor to store, in the memory, identification information of the media application and play information necessary for outputting the audio data, before pausing playing the audio data, in response to that the event is sensed.

According to an embodiment, the instructions may cause the processor to receive a signal for commanding the play of the paused audio data from the audio device within the specified time after the event is sensed, and play the paused audio data, based on the received signal.

As described above, according to various embodiments, a method of an electronic device may include playing audio data of a media application stored in the electronic device, by using an external audio device attached through a USB port, sensing an event associated with detachment from the external audio device while the audio data is being played, pausing playing the audio data, in response to that the event is sensed, identifying whether a device to the same as the external audio device is attached within a specified time after the event is sensed, and playing the paused audio data through the media application, when the device to the same as the external audio device is attached within the specified time.

According to an embodiment, the USB port may include a USB Type-C, and the sensing of the event may include sensing the event, based on short of a D+ line or a D− line included in the USB port.

According to an embodiment, the identifying of whether the device to the same as the external audio device is connected includes identifying whether the device to the same as the external audio device is attached within the specified time, based on a CC pin of the USB port.

According to an embodiment, the method may further include displaying a first GUI for indicating that the play of the audio data is paused, in response to that the event is sensed, and displaying a second GUI for indicating that the audio data is played, when the device the same as the external audio device is attached within the specified time.

According to an embodiment, the method may further include setting a volume of the audio data to be mute, in response to that the event is sensed, and recovering the volume of the audio data, when the device to the same as the external audio device is attached within the specified time.

According to an embodiment, the method may further include storing, in a memory, identification information of the media application and play information necessary for outputting the audio data, before pausing playing the audio data, in response to that the event is sensed.

According to an embodiment, the method may further include receiving a signal for commanding the play of the paused audio data from the audio device within the specified time after the event is sensed, and playing the paused audio data, based on the received signal.

As described above, according to various embodiments, an audio device (e.g., 201 of FIG. 2) may include a USB port (e.g., 220 of FIG. 2) configured to be wiredly attached to an external electronic device, and a processor (e.g., 120 of FIG. 1) operatively connected to the USB port. The processor may sense that the audio device is attached to the external electronic device through the USB port, sense an event associated with detachment from the external electronic device while outputting audio data generated from the external electronic device, identify whether a device to the same as the external electronic device is attached within a specified time, after sensing the event, and transmit a signal for commanding play of the audio data to the external electronic device, when the device to the same as the external electronic device is attached within the specified time.

According to an embodiment, the USB port may include a USB Type-C.

According to an embodiment, the process may sense the event based on short of a D+ line or the D− line included in the USB port.

According to an embodiment, the processor may identify whether the device to the same as the external audio device is attached within the specified time, based on a CC pin of the USB port.

According to an embodiment, the audio device may include an earphone or a headset.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, the electronic device attached to the external audio device through the USB port may play the audio data even if the external shock is applied, thereby providing a continuous service to a user.

Besides, a variety of effects directly or indirectly understood through the disclosure may be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a universal serial bus (USB) port configured to be wiredly attached to an external audio device;
   a processor operatively connected to the USB port; and
   a memory operatively connected to the processor,
   wherein the memory stores a media application to play audio data, and
   wherein the memory stores instructions that when executed, cause the processor to:
      play the audio data through the media application,
      sense an event associated with detachment of the external audio device while the audio data is being played,
      set a volume of the audio data to be mute and outputting the audio data, in response to the event being sensed,
      identify whether a device matching the external audio device is attached within a specified time after the event is sensed,
      recover the volume of the audio data, through the media application, based on the device matching the external audio device being attached within the specified time, and
      pause the outputting of the audio data, when the device matching the external audio device is not attached within the specified time.

2. The electronic device of claim 1, wherein the USB port includes a USB Type-C.

3. The electronic device of claim 2, wherein the instructions cause the processor to:
   sense the event based on shorting of a D+ line or a D− line.

4. The electronic device of claim 2, wherein the instructions cause the processor to:
   identify whether the device matching the external audio device is attached within the specified time is based on a CC pin of the USB port.

5. The electronic device of claim 1, further comprising:
   a display,
   wherein the instructions cause the processor to:
      display, through the display, a first graphic user interface (GUI) for indicating that the volume of the audio data is to be mute, in response to the event being sensed, and
      display, through the display, a second GUI for indicating that the audio data is output, based on the device matching the external audio device is attached within the specified time.

6. The electronic device of claim 1, wherein the instructions cause the processor to:
   store, in the memory, identification information of the media application, and
   play information necessary for outputting the audio data, before setting the volume of the audio data to be mute, in response to the event being sensed.

7. The electronic device of claim 1, wherein the instructions cause the processor to:
   receive a signal for commanding the recovering the volume of the audio data from the external audio device within the specified time after the event being sensed, and
   recover the volume of the audio data based on the received signal.

8. A method of an electronic device, the method comprising:

playing audio data of a media application stored in the electronic device, by using an external audio device attached through a USB port;

sensing an event associated with detachment of the external audio device while the audio data is being played;

setting a volume of the audio data to be mute and outputting the audio data, in response to the event being sensed;

identifying whether a device matching the external audio device is attached within a specified time after the event is sensed;

recovering the volume of the audio data through the media application, based on the device matching the external audio device being attached within the specified time; and pausing the outputting of the audio data, when the device matching the external audio device is not attached within the specified time.

9. The method of claim 8, wherein the USB port includes a USB Type-C, and wherein the sensing of the event includes:

sensing the event based on shorting of a D+ line or a D− line included in the USB port.

10. The method of claim 9, wherein identifying whether the device matching the external audio device is connected includes:

identifying whether the device matching the external audio device is attached within the specified time based on a CC pin of the USB port.

11. The method of claim 8, further comprising:

displaying a first GUI for indicating that the volume of the audio data is to be mute, in response to the event being sensed; and displaying a second GUI for indicating that the audio data is output, based on the device matching the external audio device being attached within the specified time.

12. The method of claim 8, further comprising:

storing, in a memory, identification information of the media application and play information necessary for outputting the audio data, before setting the volume of the audio data to be mute, in response to the event being sensed.

13. The method of claim 8, further comprising:

receiving a signal for commanding the recovering the volume of the audio data from the external audio device within the specified time after the event being sensed, and recovering the volume of the audio data based on the received signal.

14. An audio device comprising:

a USB port configured to be wiredly attached to an external electronic device; and a processor operatively connected to the USB port, wherein the processor is configured to:

sense that the audio device is attached to the external electronic device through the USB port, output audio data received from the external electronic device through the USB port, sense an event associated with detachment of the external electronic device, identify whether a device that matches the external electronic device is attached within a specified time, after sensing the event, and transmit a signal for commanding outputting of the audio data to the external electronic device, based on the device matching the external electronic device being attached within the specified time.

15. The audio device of claim 14, wherein the USB port includes a USB Type-C.

16. The audio device of claim 15, wherein the processor is configured to:

sense the event based on short of a D+ line or a D− line included in the USB port.

17. The audio device of claim 15, wherein the processor is configured to:

identify whether the device matching the external electronic device is attached within the specified time based on a CC pin of the USB port.

18. The audio device of claim 14, wherein the audio device includes an earphone or a headset.

* * * * *